United States Patent
Hidaka

(10) Patent No.: US 8,740,595 B2
(45) Date of Patent: Jun. 3, 2014

(54) GEAR PUMP

(75) Inventor: Yuuichi Hidaka, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 660 days.

(21) Appl. No.: 12/751,789

(22) Filed: Mar. 31, 2010

(65) Prior Publication Data

US 2010/0260638 A1 Oct. 14, 2010

(30) Foreign Application Priority Data

Apr. 10, 2009 (JP) ................................ 2009-095722

(51) Int. Cl.

| F01C 11/00 | (2006.01) |
| F04C 14/16 | (2006.01) |
| F04C 11/00 | (2006.01) |
| F04C 2/14 | (2006.01) |
| F04C 15/00 | (2006.01) |
| F04C 2/18 | (2006.01) |
| F04B 9/02 | (2006.01) |
| F16H 39/36 | (2006.01) |
| F16D 31/04 | (2006.01) |
| F16D 67/00 | (2006.01) |

(52) U.S. Cl.
CPC ............... *F04C 14/16* (2013.01); *F04C 11/001* (2013.01); *F04C 2/14* (2013.01); F04C 15/0057 (2013.01); F04C 2270/56 (2013.01); F04C 2/18 (2013.01); *F04B 9/02* (2013.01); *F16H 39/36* (2013.01); *F16D 31/04* (2013.01); *F16D 67/00* (2013.01)
USPC ....................................................... 418/199

(58) Field of Classification Search
CPC .......... F04C 14/06; F04C 11/001; F04C 2/14; F04C 15/0057; F04C 2270/56; F04C 2/18; F04B 9/02; F16H 39/36; F16D 31/04; F16D 67/00
USPC ........... 417/53, 223, 319, 423.1, 557; 418/21, 418/104, 191, 199, 200, 205, 206.1, 206.2, 418/270; 475/50, 52, 55, 58, 136; 477/69, 477/123
See application file for complete search history.

(56) References Cited

U.S. PATENT DOCUMENTS 2,293,126 A * 8/1942 Fersing ............................ 418/21
4,553,914 A * 11/1985 Noell et al. ...................... 418/69

(Continued)

FOREIGN PATENT DOCUMENTS

| JP | 5-79472 A | 3/1993 |
| JP | 7-233787 A | 9/1995 |

(Continued)

OTHER PUBLICATIONS

Chinese Office Action dated Sep. 9, 2011, issued in corresponding Chinese Patent Application No. 2010-10164016.8.

*Primary Examiner* — Kenneth Bomberg
*Assistant Examiner* — Jason T Newton
(74) *Attorney, Agent, or Firm* — Westerman, Hattori, Daniels & Adrian, LLP

(57) ABSTRACT

A gear pump includes: a first pump constructed from a first drive gear rotated by driving of a drive shaft and a first driven gear rotatably arranged coaxially with a rotary shaft; and a second pump constructed from a second drive gear rotatably provided coaxially with the rotary shaft and a second driven gear. The rotary shaft allows the first driven gear and the second drive gear to engage with and disengage from each other in a rotation direction by movement to an axial direction. When the discharge pressure is higher than predetermined pressure, rotation of the first driven gear is not transmitted to the second drive gear and only the first pump operates. When the discharge pressure becomes the predetermined pressure or less, the rotation of the first driven gear is transmitted to the second drive gear and the first and the second pumps operate.

6 Claims, 6 Drawing Sheets

(56) References Cited

U.S. PATENT DOCUMENTS

| | | | |
|---|---|---|---|
| 5,290,153 A * | 3/1994 | Schmidt | 417/216 |
| 5,326,232 A * | 7/1994 | McDonnel et al. | 417/319 |
| 5,378,130 A * | 1/1995 | Ozeki et al. | 418/102 |
| 7,503,753 B2 | 3/2009 | Yasui | |
| 7,717,690 B2 * | 5/2010 | Hoji et al. | 418/205 |
| 2005/0175484 A1 | 8/2005 | Yasui | |
| 2011/0129359 A1 * | 6/2011 | Hawkins | 417/53 |

FOREIGN PATENT DOCUMENTS

| | | |
|---|---|---|
| JP | 9-112445 A | 5/1997 |
| JP | 2005-207357 A | 8/2005 |
| JP | 2008-69770 A | 3/2008 |

\* cited by examiner

FIG.5A  A-A 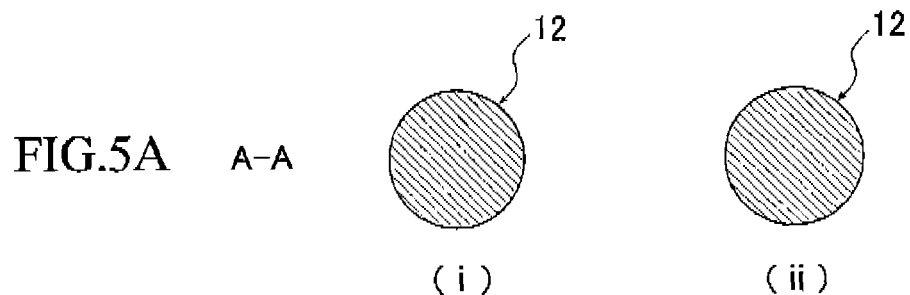
FIG.5B  B-B 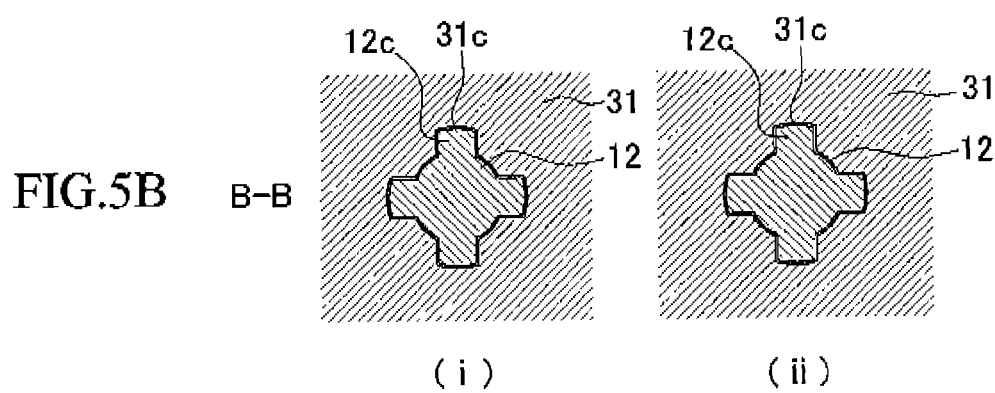
FIG.5C  C-C 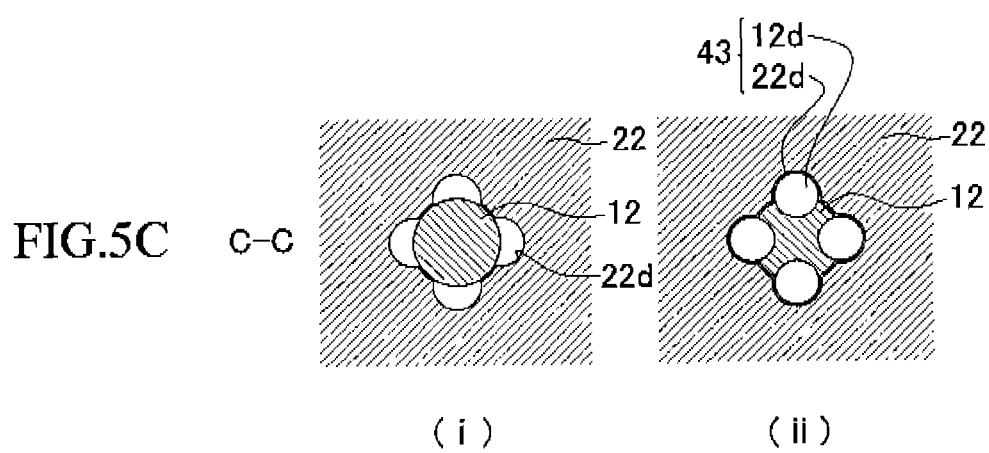
FIG.5D  D-D 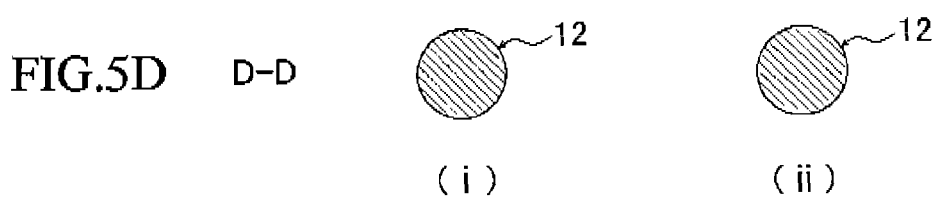

GEAR PUMP

CROSS-REFERENCE TO RELATED APPLICATION

The present disclosure relates to subject matter contained in Japanese Patent Application No. 2009-095722, filed on Apr. 10, 2009, the disclosure of which is expressly incorporated herein by reference in its entirety.

BACKGROUND OF THE INVENTION

1. Field of the Invention

The present invention relates to a gear pump driven by a drive source such as an engine, and more particularly, the present invention relates to a variable displacement gear pump.

2. Description of the Related Art

A discharge flow rate of a gear engagement type pump is determined by a capacity of the pump corresponding to a height, a width of each tooth and the like and rotation speed of a gear (the number of rotations of pump). In the case of using such a gear pump as an oil pump for a vehicle, a capacity of the oil pump depends upon the rotation number of an engine that is a drive source. For this reason, depending upon a driving situation of the vehicle, a discharge flow rate of the oil pump may run short with respect to a flow rate required at a supply portion, whereby a necessary amount of oil cannot be supplied appropriately.

Heretofore, in order to deal with such a problem, variable displacement gear pumps as shown in Japanese Patent Application Publication No. 7-233787, Japanese Patent Application Publication No. 2008-69770, Japanese Patent Application Publication No. 5-79472 and Japanese Patent Application Publication No. 2005-207357 (hereinafter, referred to respectively as "Patent Literatures 1 to 4") have been proposed. A gear pump disclosed in Patent Literature 1 has an oil-pressure regulating valve for returning part of a discharge rate to a suction side in accordance with discharge pressure of oil to be discharged. This oil-pressure regulating valve allows a capacity of the gear pump (oil pump) to be changed. Further, a gear pump disclosed in Patent Literature 2 adjusts a capacity thereof by changing an engagement width between a drive gear and a driven gear in accordance with the number of rotations of the gear pump. A gear pump disclosed in Patent Literature 3 can change a percentage of a discharge port portion in a fluid discharged space in accordance with a position of a valve, whereby the number of sets of gears corresponding to the percentage of the discharge port portion is changed and a discharge rate can thus be changed. A gear pump disclosed in Patent Literature 4 includes a technique that the rotation number of the gear pump (liquid pump) can be controlled independent of the number of revolutions of an engine.

In ones capable of adjusting a discharge capacity by means of a mechanical structure of the conventional variable displacement pumps as described above, there is a need for addition of mechanisms, such as a plurality of valves, into the gear pump. This leads to complex of a peripheral structure of the gear pump and an increase in the number of parts, and this causes an increase in a product cost thereof. Further, in one having a structure capable of changing the engagement width of the gear, there has been a problem that a mechanism of the gear pump itself becomes complicated and this leads to an increase in the number of parts and growing in size. Further, the more complicated the mechanism of the gear pump becomes, the higher accuracy of dimension the gear pump requires. For this reason, a problem also occurs in durability of the pump. Further, in the pump capable of changing the rotation number to be inputted, there has been a concern to make a control mechanism and procedures for changing the rotation number complicated.

SUMMARY OF THE INVENTION

The present invention is made in view of the above points, and it is an object of the present invention to provide a variable displacement gear pump capable of easily carrying out appropriate adjustment of a discharge flow rate even though it has a simple configuration by inhibiting an increase in parts cont (the number of parts).

In order to solve the problem described above, the present invention is directed to a gear pump. The gear pump (10) according to the present invention includes: a drive shaft (11) and a rotary shaft (12) arranged in parallel to the drive shaft (11).

The gear pump (10) also includes a first pump (20) constructed from a first drive gear (21), a first driven gear (22) rotatably arranged coaxially with the rotary shaft (12) and a first pump chamber (23) for receiving the first drive gear (21) and the first driven gear (22), the first drive gear (21) being rotated by driving of the drive shaft (11), the first driven gear (22) engaging the first drive gear (21), the first pump chamber (23) having a first suction port (24) via which oil is suctioned in accordance with rotation of the first drive gear (21) and rotation of the first driven gear (22) and a first discharge port (25) from which the oil is discharged.

The gear pump (10) also includes a second pump (30) constructed from a second drive gear (31) rotatably provided coaxially with the rotary shaft (12), a second driven gear (32) rotatably provided coaxially with the drive shaft (11) and a second pump chamber (33) for receiving the second drive gear (31) and the second driven gear (32), the second driven gear (32) engaging with the second drive gear (31), the second pump chamber (33) having a second suction port (34) via which oil is suctioned in accordance with rotation of the second drive gear (31) and rotation of the second driven gear (32) and a second discharge port (35) from which the oil is discharged.

In this case, the rotary shaft (12) allows the first driven gear (22) and the second drive gear (31) to engage with and disengage from each other in a rotation direction by being moved in an axial direction.

Further, the gear pump (10) can selectively becomes any one of a state where the first driven gear (22) and the second drive gear (31) are allowed to rotate relatively and the rotation of the first driven gear (22) is not transmitted to the second drive gear (31), thereby operating only the first pump (20) and a state where the first driven gear (22) and the second drive gear (31) are not allowed to rotate relatively and the rotation of the first driven gear (22) is transmitted to the second drive gear (31), thereby operating both of the first pump (20) and the second pump (30).

According to the gear pump of the present invention, in a two-step gear pump having two steps of drive gears and driven gears, it is possible to selectively take both of the state where the first driven gear and the second drive gear are allowed to rotate mutually and rotation of the first driven gear is not transmitted to the second drive gear and the state where the first driven gear and the second drive gear are not allowed to rotate mutually and rotation of the first driven gear is transmitted to the second drive gear. This makes it possible to selectively carry out a low pump capacity operation in which only the first pump operates and a high pump capacity operation in which both of the first pump and the second pump operate. Therefore, the variable displacement gear pump capable of easily carrying out appropriate adjustment of a discharge flow rate while inhibiting an increase in the number of parts can be configured by a simple configuration in which the first driven gear and the second drive gear are caused to engage with and disengage from each other in the rotation direction by moving the rotary shaft in the axial direction.

Further, in the gear pump described above, it is preferable that the rotary shaft (12) spline-engages with the second drive gear (31) to rotate together with the second drive gear (31), and the gear pump (10) further includes: an engaging section (43) for causing the rotary shaft (12) to engage with or disengage from the first driven gear (22) with movement of the rotary shaft (12). In this case, when the rotary shaft (12) is positioned at the first pump (20) side, the engaging section (43) causes the rotary shaft (12) to spline-engage with the first driven gear (22), whereby the second drive gear (31) and the first driven gear (22) are not allowed to rotate mutually. On the other hand, when the rotary shaft (12) is positioned at the second pump (30) side, the engaging section (43) causes spline engagement of the rotary shaft (12) with the first driven gear (22) to be released, whereby the second drive gear (31) and the first driven gear (22) are allowed to rotate mutually. This makes it possible to surely control the operation of the second pump by means of movement of the rotary shaft in spite of the simple configuration. Further, it is also possible to retain durability of the gear pump.

Further, in the gear pump described above, it is preferable to further include two oil chambers (41, 42) for respectively applying hydraulic pressures to both ends of the rotary shaft (12), wherein the gear pump (10) is configured so that the rotary shaft (12) moves in the axial direction in accordance with loads applied to the both ends (12a, 12b) of the rotary shaft (12) due to a difference between pressures of the two oil chambers (41, 42). In this case, it is preferable that an oil passage (53, 55) in which the oil discharged from the first pump (20) flows is connected to each of the two oil chambers (41, 42), and the gear pump (10) is configured so that the rotary shaft (12) is positioned at the first pump (20) side when discharge pressure of the first pump (20) becomes predetermined pressure or lower. Thus, in the case where the discharge pressure (discharge rate) of the first pump is lowered, the second pump operates in addition to the first pump. For that reason, it is possible to restore the lowered discharge pressure by increasing the discharge rate of the entire gear pump. Therefore, this makes it possible to adjust an appropriate discharge rate in response to a demand of the oil at a supply destination.

In this regard, reference numerals in parenthesis described above are shown as one example of the present invention to indicate reference numerals of corresponding components of embodiments (will be described later).

According to the gear pump of the present invention, it is possible to easily carry out appropriate adjustment of a discharge flow rate while having a simple configuration by inhibiting an increase in the number of parts.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings:

FIG. 4 is a sectional side view of the rotary shaft, a first driven gear and a second drive gear.

FIGS. 5A to 5D are respectively sectional views taken along the lines A-A, B-B, C-C, D-D of FIGS. 4A and 4B.

DETAILED DESCRIPTION OF THE INVENTION

Hereinafter, embodiments of the present invention will be described in detail with reference to the appending drawings.

First Embodiment

Figure 1:
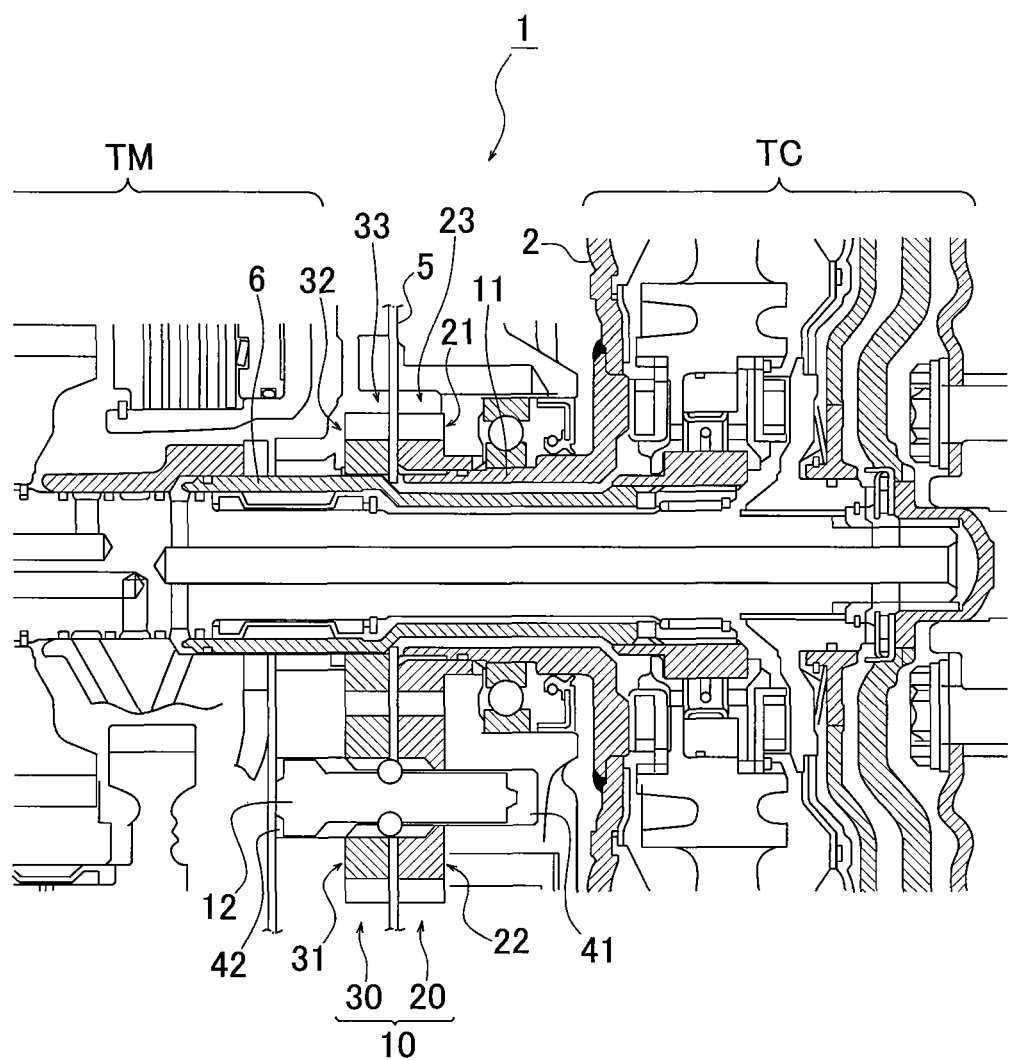
FIG. 1 is a partially sectional side view of an automatic transmission provided with an oil pump according to a first embodiment of the present invention.
Figure 2:
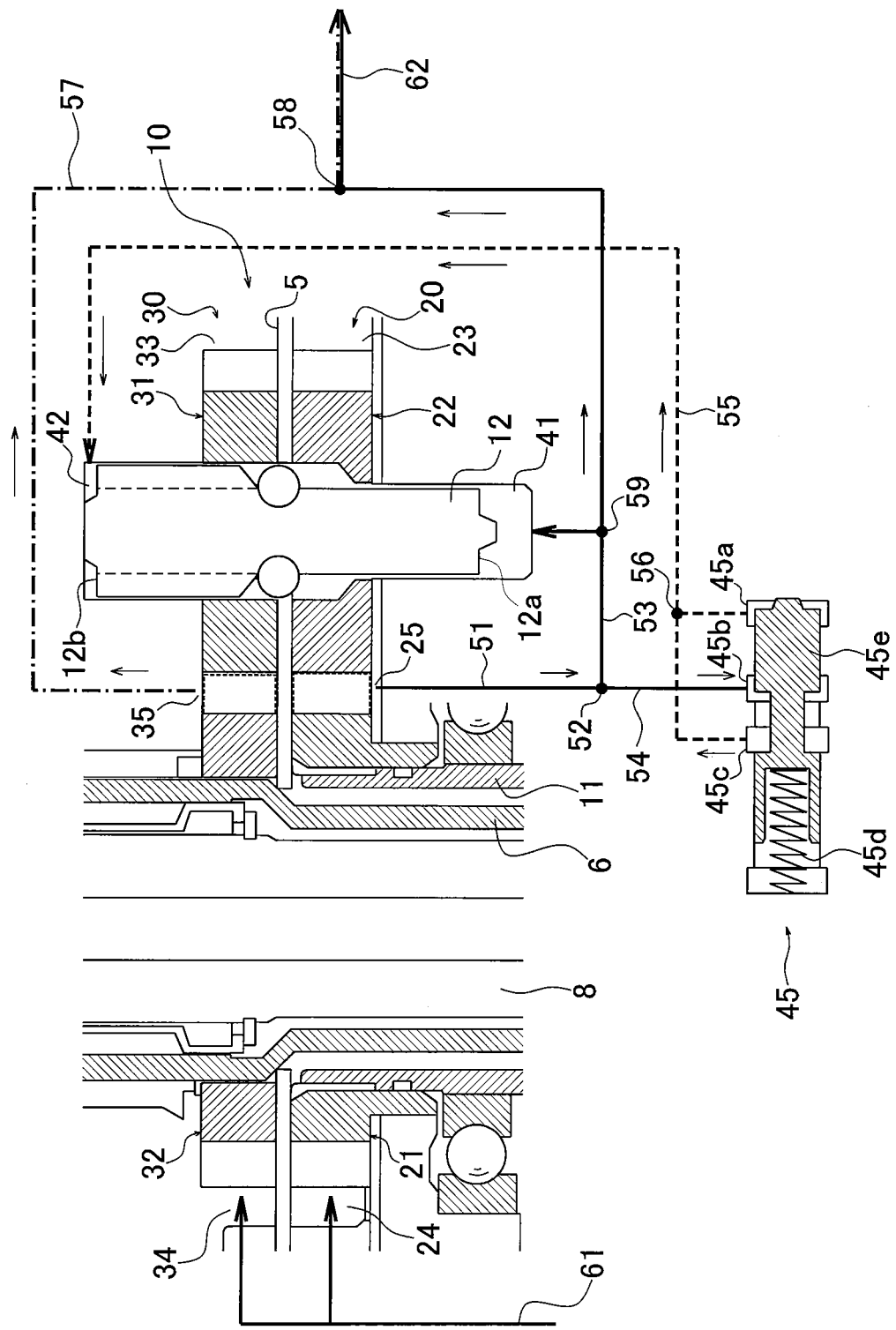
FIG. 2 is a sectional side view of the oil pump.
Figure 3:
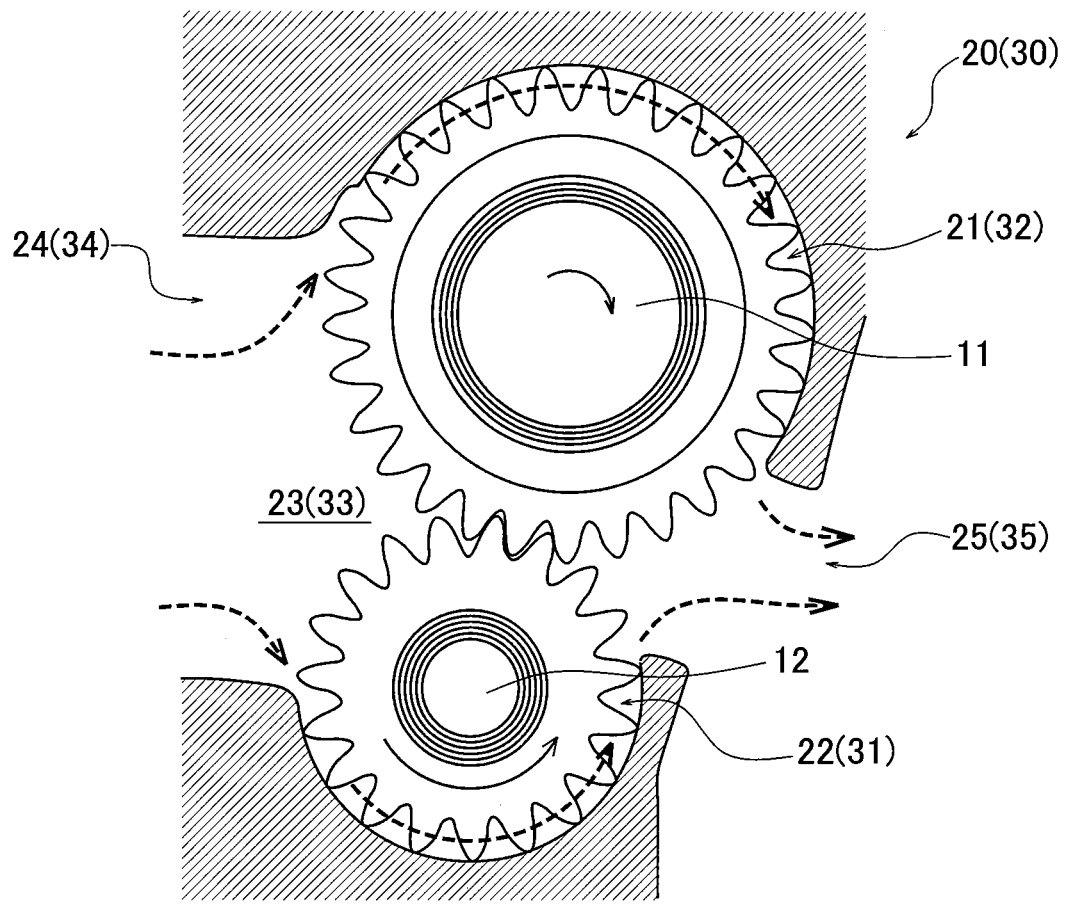
FIG. 3 is a schematic side view when viewed from an axial direction of a drive shaft and a rotary shaft of the oil pump.

FIG. 1 is a partially sectional side view of an automatic transmission provided with an oil pump (gear pump) 10 according to a first embodiment of the present invention. FIG. 2 is a sectional side view for explaining a detailed configuration of the oil pump 10. FIG. 3 is a schematic side view of the oil pump 10 when viewed from an axial direction of a drive shaft 11 and a rotary shaft 12. An automatic transmission 1 shown in FIG. 1 includes: a torque converter TC that amplifies torque inputted from an engine (not shown in the drawings) and outputs the amplified torque; and a power transmission mechanism TM for setting up a predetermined gear (gear speed). The automatic transmission 1 also includes an oil pump 10 for supplying hydraulic oil or lubricating oil (hereinafter, both referred to as "hydraulic oil") to various parts of the automatic transmission 1.

The oil pump 10 is installed between the torque converter TC and the power transmission mechanism TM. The oil pump 10 is an engagingly circumscribing type gear pump. The oil pump 10 is also a two-step gear pump provided with two steps of pumps including a first pump 20 and a second pump 30. The first pump 20 includes a drive shaft 11, a rotary shaft 12 arranged in parallel to the drive shaft 11, a first drive gear 21 to be rotated by driving of the drive shaft 11, and a first driven gear 22 that engages with the first drive gear 21. The second pump 30 includes a second drive gear 31 rotatably provided coaxially with the rotary shaft 12 and a second driven gear 32 that engages with the second drive gear 31.

The drive shaft 11 is a hollow cylindrical member integrally connected to an impeller shell 2 of the torque converter TC. The drive shaft 11 is adapted to rotate by transmitting rotation of the engine. A cylindrical stator shaft (fixed shaft) 6 arranged coaxially with the drive shaft 11 penetrates the inside of the drive shaft 11. The stator shaft 6 is provided at an outer circumference of the main shaft 8 that transmits the rotation of the engine to the power transmission mechanism TM. The stator shaft 6 does not rotate itself.

The first pump 20 is constructed from the first drive gear 21 driven by the drive shaft 11, the first driven gear 22 driven by the first drive gear 21, and a first pump chamber 23 that receives (or stores) these first drive gear 21 and first driven gear 22. The first drive gear 21 is fixed at an outer circumference of the drive shaft 11 by means of spline engagement. The first driven gear 22 is rotatably provided coaxially with the rotary shaft 12. The first driven gear 22 engagingly circumscribes the first drive gear 21. As shown in FIG. 3, a first suction port (inlet) 24 and a first discharge port (delivery port) 25 are formed in the first pump chamber 23. Hydraulic oil is suctioned via the first suction port 24 in accordance with rotation of the first drive gear 21 and the first driven gear 22. The hydraulic oil is then discharged from the first discharge port 25.

In this first pump 20, the hydraulic oil at the first suction port 24 side is taken in gaps between the first drive gear 21 and an internal wall of the first pump chamber 23 and gaps between the first driven gear 22 and an internal wall of the first pump chamber 23 by means of rotation of the first drive gear 21 to which rotation of the drive shaft 11 is transmitted and rotation of the first driven gear 22 engaging with the first drive gear 21. The hydraulic oil is fed along outer circumferences of the first drive gear 21 and the first driven gear 22, and is discharged from the first discharge port 25.

Referring again to FIG. 2, the second pump 30 is constructed from: the second drive gear 31 rotatably provided coaxially with the rotary shaft 12; the second driven gear 32 rotatably provided coaxially with the drive shaft 11 and engaging with the second drive gear 31; and a second pump chamber 33 that receives (or stores) these second drive gear 31 and second driven gear 32. The second driven gear 32 rotatably engages with an outer circumferential surface of the stator shaft 6 by means of slidable contact of metallic surfaces. As shown in FIG. 3, a second suction port (inlet) 34 and a second discharge port (delivery port) 35 are formed in the second pump chamber 33. The hydraulic oil is suctioned via the second suction port 34 in accordance with rotation of the second drive gear 31 and rotation of the second driven gear 32. The hydraulic oil is then discharged from the second discharge port 35.

A laminated separate plate 5 is provided between end surfaces of the first drive gear 21 and the second driven gear 32 arranged in the axial direction and between end surfaces of the first driven gear 22 and the second drive gear 31. This separate plate 5 causes the first pump chamber 23 and the second pump chamber 33 to be separated. In this regard, the first drive gear 21 of the first pump 20 and the second driven gear 32 of the second pump 30, which are arranged coaxially, have the same size and shape as each other. The first driven gear 22 of the first pump 20 and the second drive gear 31 of the second pump 30 also have the same size and shape as each other.

Figure 4A:
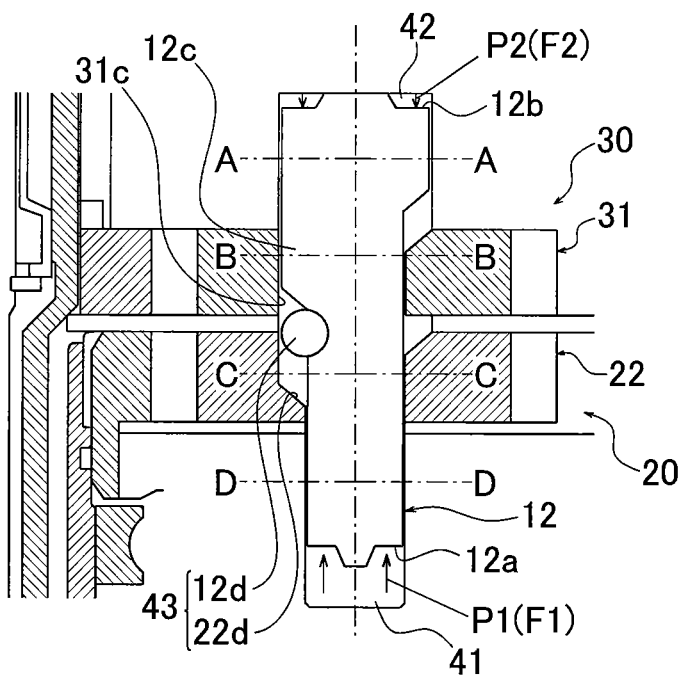
FIG. 4A shows a state where the rotary shaft is positioned at a second pump side and FIG. 4B shows a state where the rotary shaft is positioned at a first pump side.
Figure 4B:
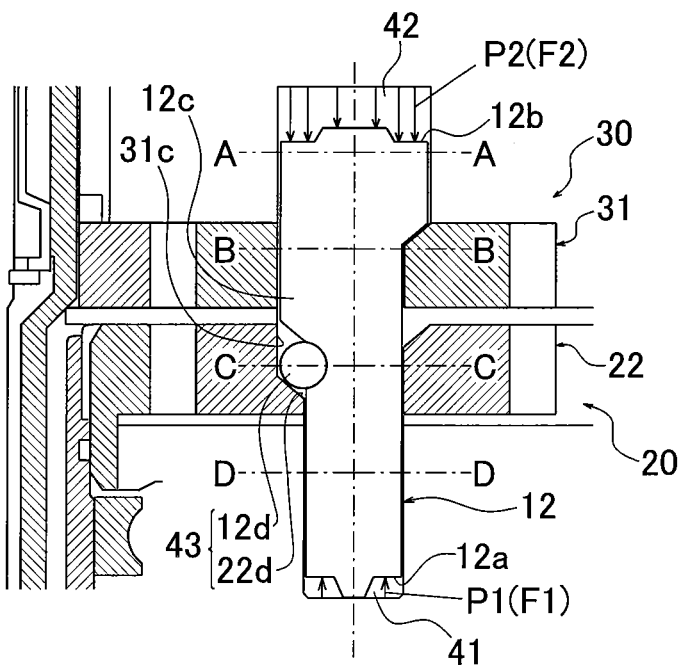

FIG. 4A is a sectional side view showing the rotary shaft 12 and first driven gear 22 and a part of the second drive gear 31. FIG. 4A shows a state where the rotary shaft 12 is positioned at the second pump 30 side. FIG. B is a sectional side view showing the rotary shaft 12 and first driven gear 22 and a part of the second drive gear 31. FIG. 4B shows a state where the rotary shaft 12 is positioned at the first pump 20 side. Further, FIGS. 5A to 5D are respectively schematic sectional views taken along the lines A-A, B-B, C-C and D-D of FIGS. 4A and 4B, and columns (i) and (ii) show states corresponding to states of FIGS. 4A, 4B, respectively. In this regard, in FIGS. 4A and 4B, a sectional surface on which a key 12c (will be described later) is formed is shown at a left side from the center of the rotary shaft 12, and a sectional surface in which no key 12c is formed is shown at a right side from the center of the rotary shaft 12. Hereinafter, detailed configurations and operations of the rotary shaft 12, the first driven gear 22 and the second drive gear 31 will be described using these drawings.

The rotary shaft 12 is constructed from a columnar member that penetrates the center of the second drive gear 31 and the center of the first driven gear 22. The rotary shaft 12 is provided slidably in the axial direction. A first oil chamber 41 and a second oil chamber 42 are respectively provided at positions corresponding to both end surfaces 12a, 12b of the rotary shaft 12. The first oil chamber 41 and the second oil chamber 42 are used for applying hydraulic pressure to the end surface 12a and the end surface 12b, respectively. Namely, the end surface (lower end surface of the drawings) 12a at the first pump 20 side of the rotary shaft 12 is received on the first oil chamber 41. On the other hand, the end surface (upper end surface of the drawings) 12b at the second pump 30 side is received on the second oil chamber 42.

A diameter of the rotary shaft 12 changes in the middle of the axial direction. As shown in FIGS. 5A and 5D, the diameter of the rotary shaft 12 at the first pump 20 side is different from that at the second pump 30 side. Thus, an area (pressure receiving area against the first oil chamber 41) S1 of the end surface 12a at the first pump 20 side is different from an area (pressure receiving area against the second oil chamber 42) S2 of the end surface 12b at the second pump 30 side. Here, the area S1 is smaller than the area S2 (S1<S2). The rotary shaft 12 is adapted to move in the axial direction in accordance with pressure P1 of the hydraulic oil supplied to the first oil chamber 41 and pressure P2 of the hydraulic oil supplied to the second oil chamber 42.

Namely, when the pressure P1 is higher than the pressure P2 (P1>P2) and a load F1 applied to the end surface 12a is larger than a load F2 applied to the end surface 12b (F1>F2), the rotary shaft 12 is positioned at the second pump 30 side. Further, even in the case of P1>P2, the load F2 applied to the end surface 12b may be larger than the load F1 applied to the end surface 12a (F1<F2) depending upon a difference between the areas of the pressure receiving areas S1, S2 of both of the end surfaces 12a, 12b of the rotary shaft 12 (that is, S1<S2). At this state, the rotary shaft 12 moves to the first pump 20 side. Further, when the pressure P1 is substantially the same as the pressure P2 (P1≅P2), the load F2 applied to the end surface 12b is larger than the load F1 applied to the end surface 12a (F1<F2). For that reason, the rotary shaft 12 moves to the first pump 20 side. Further, when the pressure P1 is lower than the pressure P2 (P1<P2), the load F2 is larger than the load F1 (F1<F2). For that reason, the rotary shaft 12 is positioned at the first pump 20 side.

As shown in FIG. 5B, four keys 12c are formed on an outer circumferential surface of the rotary shaft 12. Each of the keys 12c is composed of a small linear projection extending to the axial direction of the rotary shaft 12. Four key grooves 31c to engage with the keys 12c are formed on an inner circumferential surface of the second drive gear 31. The key grooves 31c allow the keys 12c to move only in the axial direction (longitudinal direction of the rotary shaft 12. Plural sets of the key 12c and the key groove 31c (four sets in the drawing) are formed at even intervals along an outer circumferential direction of the rotary shaft 12. These keys 12c and key grooves 31c cause the rotary shaft 12 to spline-engage with the second drive gear 31, whereby the rotary shaft 12 and the second drive gear 31 always rotate together.

Further, a microspherical ball element 12d is fixed at a lower end of each of the keys 12c in the rotary shaft 12. On the other hand, as shown in FIG. 5C, four substantially hemispherical ball grooves 22d are formed on an inner circumferential surface of the first driven gear 22. The ball grooves 22d cause the ball elements 12d to engage with the first driven gear 22. Each of the ball elements 12d is adapted to engage with or disengage from the corresponding ball groove 22d by means of movement of the rotary shaft 12. When the ball elements 12d engage with the ball grooves 22d, the rotary shaft 12 spline-engages with the first driven gear 22, whereby the rotary shaft 12 and the first driven gear 22 rotate together. On the other hand, when the ball elements 12d disengage from the ball grooves 22d, spline engagement of the rotary shaft 12 with the first driven gear 22 is released, whereby the rotary shaft 12 and the first driven gear 22 are allowed to rotate mutually. An engaging section 43 for causing the rotary shaft 12 to spline-engage with the first driven gear 22 is constructed from these ball element 12d and ball groove 22d. Therefore, as shown in FIG. 4A, when the rotary shaft 12 is positioned at the first pump 20 side, the second drive gear 31 spline-engages with the first driven gear 22. As shown in FIG. 4B, when the rotary shaft 12 is positioned at the second pump 30 side, the spline engagement of the second drive gear 31 with the first driven gear 22 is released.

Further, as shown in FIG. 2, an oil passage 51 in which the hydraulic oil discharged from a first discharge port 25 of the first pump 20 flows are branched into two passages at a bifurcation section 52. An oil passage 53, which is one of the two passages branched from the bifurcation section 52, communicates with a supply portion (not shown in the drawings) of the hydraulic oil at a downstream side, and the oil passage 53 is further branched at a bifurcation section 59 in the middle thereof to further communicate with the first oil chamber 41. Thus, pressure of the hydraulic oil discharged from the first discharge port 25 is adapted to be applied to the one end surface 12a of the rotary shaft 12. Further, an oil passage 54, which is the other of the two passages branched from the bifurcation section 52, communicates with the second oil chamber 42 via a regulator valve 45. Thus, pressure of the hydraulic oil discharged from the regulator valve 45 is adapted to be applied to the other end surface 12b of the rotary shaft 12.

The regulator valve (spool valve) 45 is configured so as to include a first port 45a, a second port 45b, a third port 45c, a spring 45d and a spool 45e biased by the spring 45d. The oil passage 54 branched from the bifurcation section 52 is connected to the second port 45b of the regulator valve 45. Further, the third port 45c is connected to the second oil chamber 42 by means of an oil passage 55. In a steady state, the spool 45e is biased to a right end shown in FIG. 2 by means of biasing force of the spring 45d, whereby the second port 45b communicates with the third port 45c. Therefore, the hydraulic oil of the oil passage 54 is introduced into the second oil chamber 42 through the third port 45c and the oil passage 55 from the second port 45b.

Further, the oil passage 55 is branched at a bifurcation section 56, which is positioned at a downstream side of the third port 45c, and is connected to the first port 45a of the regulator valve 45. Thus, the gear pump is configured so that part of the hydraulic oil flowing out from the third port 45c is returned to the first port 45a and a load due to pressure of the hydraulic oil from the third port 45c against the biasing force of the spring 45d is applied to the spool 45e. Therefore, when pressure of the hydraulic oil introduced into the first port 45a, that is, pressure of the hydraulic oil flowing out from the third port 45c to the second oil chamber 42 becomes predetermined pressure or higher, the spool 45e moves to the left against the biasing force of the spring 45d. This causes an oil passage (spool groove) between the second port 45b and the third port 45c to be cut off, whereby supply of the hydraulic pressure to the second oil chamber 42 is stopped.

Further, the oil passage 53 in which the hydraulic oil discharged from the first discharge port 25 of the first pump 20 flows and an oil passage 57 in which the hydraulic oil discharged from the second discharge port 35 of the second pump 30 join at a junction section 58 and bring together ahead to become an oil passage 62 that is a single line of a discharge side. The oil passage 62 at this discharge side communicates with the supply portion of the hydraulic oil.

Next, an operation of the oil pump 10 having the configuration described above will be described. In this regard, the case where rotation of the first drive gear 21 by the drive shaft 11 is constant and the hydraulic oil discharged from the first pump 20 is kept at constant pressure will be described here. In the oil pump 10, rotation of the drive shaft 11 with rotation of the engine causes the first drive gear 21 and the first driven gear 22 engaging with the first drive gear 21 to rotate, whereby the first pump 20 operates. By means of an operation of the first pump 20, the hydraulic oil of the oil passage 61 at a suction side is suctioned from the first suction port 24, and is discharged from the first discharge port 25. The hydraulic oil discharged from the first discharge port 25 is supplied to the supply portion through the oil passages 51, 52 and the oil passage 62 at the discharge side.

Here, while the amount of consumption at a supply destination of the hydraulic oil is lower than a discharge rate of the first pump 20, discharge pressure of the first pump 20 is kept at constant pressure. For that reason, the spool 45e is positioned at a left end against the biasing force of the spring 45d by means of pressure of the hydraulic oil returned to the first port 45a of the regulator valve 45. This causes the oil passage between the second port 45b and the third port 45c to be cut off, whereby supply of the hydraulic pressure to the second oil chamber 42 is stopped. Therefore, the load F1 applied to the end surface 12a of the rotary shaft 12 by means of the pressure P1 of the first oil chamber 41 is larger than the load F2 applied to the end surface 12b of the rotary shaft 12 by means of the pressure P2 of the second oil chamber 42 (F1>F2). For that reason, the rotary shaft 12 is positioned at the second pump 30, and relative fixation between the second drive gear 31 and the first driven gear 22 is released. This causes the second drive gear 31 not to rotate in spite of rotation of the first driven gear 22, whereby the second pump 30 stops.

When the amount of consumption at the supply destination of the hydraulic oil is more than the discharge rate of the first pump 20 at this state, discharge pressure of the hydraulic oil by the first pump 20 is lowered. When the discharge pressure of the first pump 20 is lowered, pressure returned to the first port 45a of the regulator valve 45 is lowered. For that reason, the spool 45e moves to the right by means of the biasing force of the spring 45d to open the oil passage between the second port 45b and the third port 45c, whereby supply of the hydraulic pressure to the second oil chamber 42 is carried out. When depending upon the difference between the areas S1, S2 of both of the end surfaces 12a, 12b of the rotary shaft 12, the load F1 applied to the end surface 12a of the rotary shaft 12 due to the pressure P1 of the first oil chamber 41 is larger than the load F2 applied to the end surface 12b of the rotary shaft 12 due to the pressure P2 of the second oil chamber 42 (F2>F1) at this state, the rotary shaft 12 moves to the first pump 20 side to spline-engage with the first driven gear 22. Thus, since the first driven gear 22 and the second drive gear 31 are not allowed to rotate relatively, the second drive gear 31 is rotated together with the first driven gear 22 in accordance with rotation of the first driven gear 22. Therefore, the second drive gear 31 and the second driven gear 32 engaging with the second drive gear 31 rotate, whereby the second pump 30 operates. By means of an operation of the second pump 30, a supply amount of the hydraulic oil of the entire oil pump 10 becomes a supply amount of both the first pump 20 and the second pump 30. Therefore, it is possible to restore the discharge pressure (supply pressure) of the hydraulic oil, which has been lowered until then, to the constant pressure.

Then, when the restored discharge pressure of the first pump 20 (that is, discharge pressure of the entire oil pump 10) becomes higher than the constant pressure again, the spool 45e moves to the left against the biasing force of the spring 45d by means of pressure returned to the first port 45a of the regulator valve 45. This causes the oil passage between the second port 45b and the third port 45c to be cut off, whereby the supply of the hydraulic pressure to the second oil chamber 42 is stopped. Therefore, the rotary shaft 12 moves to the second pump 30 side, and the relative fixation between the first driven gear 22 and the second drive gear 31 is released. This causes the second drive gear 31 not to rotate in spite of rotation of the first driven gear 22, whereby the second pump 30 stops. The procedures as described above are repeatedly carried out during an operation of the oil pump 10.

As explained above, in the oil pump 10 according to the present embodiment, when the rotary shaft 12 is positioned at the second pump 30 side, the first driven gear 22 and the second drive gear 31 are allowed to rotate mutually. Thus, rotation of the first driven gear 22 is not transmitted to the second drive gear 31, whereby only the first pump 20 operates. Further, when the rotary shaft 12 is positioned at the first pump 20 side, the first driven gear 22 and the second drive gear 31 are not allowed to rotate mutually. In this case, rotation of the first driven gear 22 is transmitted to the second drive gear 31, whereby both of the first pump 20 and the second pump 30 operate. Therefore, it is possible to selectively carry out, in accordance with the position of the rotary shaft 12, a low pump capacity operation in which only the first pump 20 operates and a high pump capacity operation in which both of the first pump 20 and the second pump 30 operate. Thus, the variable displacement oil pump (gear pump) 10 capable of arbitrarily changing a pump capacity while inhibiting an increase in parts cont (the number of parts) can be configured by a simple configuration in which the first driven gear 22 and the second drive gear 31 are caused to engage with and disengage from each other in the rotation direction by moving the rotary shaft 12 in the axial direction.

Further, in the oil pump 10 according to the present embodiment, the rotary shaft 12 has an engaging section 43 that spline-engages with the second drive gear 31, thereby always rotating together with the second drive gear 31 and that engages and disengages with and from the first driven gear 22 with movement in the axial direction. Thus, when the rotary shaft 12 is positioned at the first pump 20 side, the rotary shaft 12 spline-engages with the first driven gear 22, and the second drive gear 31 and the first driven gear 22 are not allowed to rotate relatively. On the other hand, when the rotary shaft 12 is positioned at the second pump 30 side, the spline engagement between the rotary shaft 12 and the first driven gear 22 is released, and the second drive gear 31 and the first driven gear 22 are allowed to rotate relatively. Therefore, it becomes possible to surely control operations of the first pump 20 and the second pump 30 in spite of a simple configuration. Further, it is also possible to retain durability of the oil pump 10.

Further, in the oil pump 10, the rotary shaft 12 is adapted to move in the axial direction in accordance with the loads applied to both of the end surfaces 12a, 12b of the rotary shaft 12 due to the difference between the pressure P1 of the first oil chamber 41 and the pressure P2 of the second oil chamber 42. The oil pump 10 is configured so that the oil passages 53, 55 in each of which the hydraulic oil discharged from the first pump 20 are respectively connected to the first oil chamber 41 and the second oil chamber 42, and the rotary shaft 12 is positioned at the first pump 20 side when the discharge pressure of the first pump 20 becomes the predetermined pressure or lower. Therefore, by operating the second pump 30 when the discharge pressure of the first pump 20 is lowered, it is possible to increase a discharge flow rate of the entire oil pump 10 and to restore the lowered discharge pressure to the constant pressure. Accordingly, this makes it possible to adjust the discharge flow rate in response to a demand of the hydraulic oil at the supply destination.

Second Embodiment

Next, an oil pump according to a second embodiment of the present invention will be described. In this regard, in explanation of the second embodiment and the corresponding drawing, the same reference numerals are assigned to components (constituent parts) the same as or similar to those in the first embodiment, and detailed explanation for the components is omitted below. Further, matter other than the matter that will be described below and matter shown in the drawings are similar to those in the first embodiment.

Figure 6:
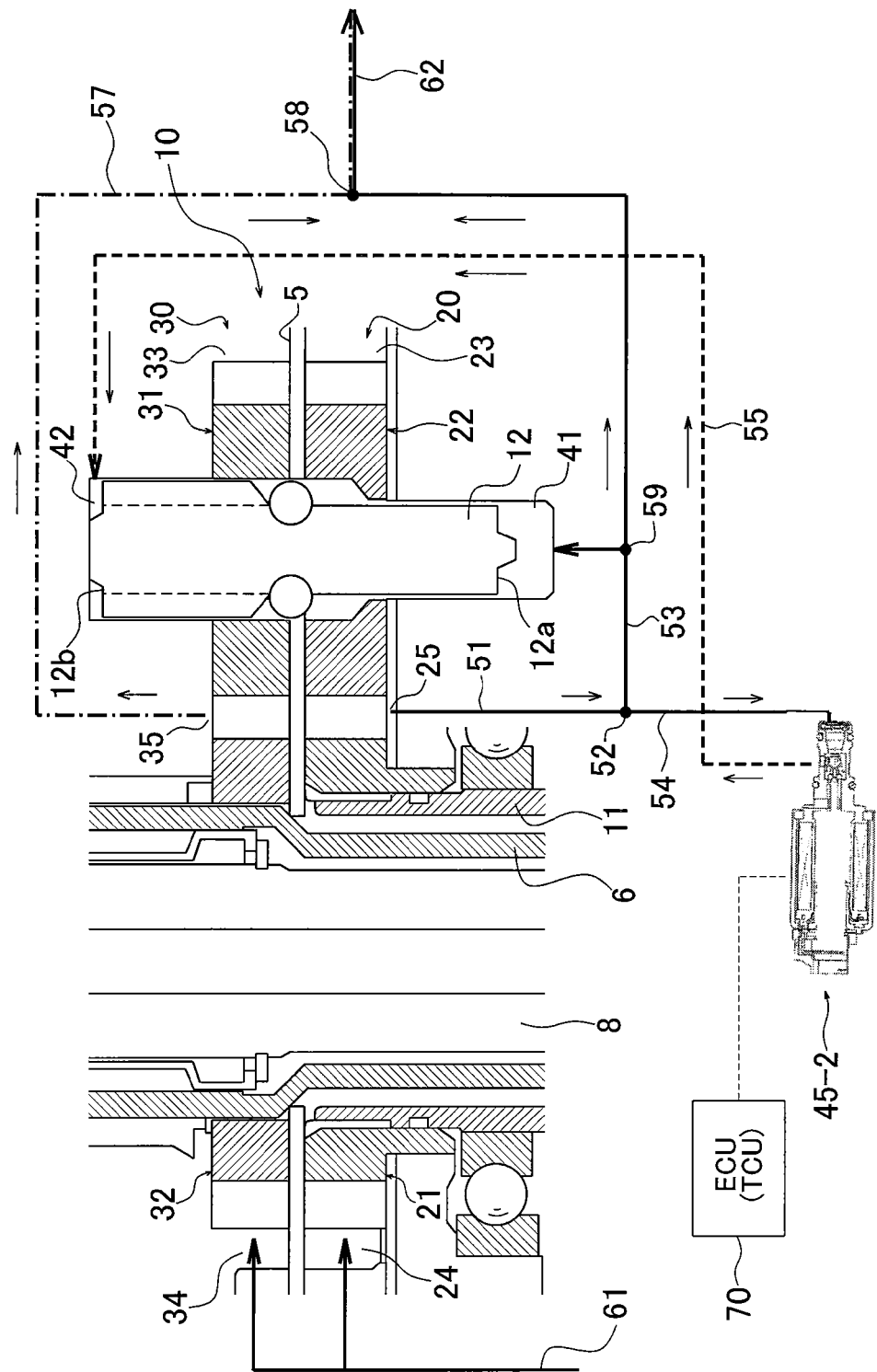
FIG. 6 is a sectional side view of an oil pump according to a second embodiment of the present invention.

FIG. 6 is a view showing a configuration of an oil pump 10-2 according to the second embodiment. The oil pump 10-2 according to the present embodiment includes an electromagnetic solenoid valve 45-2 operated in response to a command of an ECU (or TCU) 70 in place of the regulator valve (spool valve) 45 included in the oil pump 10 according to the first embodiment. The configuration of the oil pump 10-2 other than the electromagnetic solenoid valve 45-2 is the same as that of the oil pump 10 according to the first embodiment. In the electromagnetic solenoid valve 45-2, open or close of the oil passage 55 communicating with the second oil chamber 42 (communication control between the second port 45b and the third port 45c) is carried out by means of electric control based on a command of the ECU 70. This makes it possible to control operation of the second pump 30, whereby a discharge rate of the oil pump 10 can be adjusted.

In the present embodiment, by replacing the regulator valve 45 with the electromagnetic solenoid valve 45-2, it is possible to control the operation of the second pump 30 regardless of the hydraulic pressure (flow rate) of the hydraulic oil discharged from the first pump 20. Therefore, it is possible to adjust the discharge rate of the oil pump 10 to an arbitrary discharge rate appropriate to the supply portion.

Although the embodiments of the present invention have been explained above, the present invention is not limited to the above embodiments. Various modifications can be made in a scope of the technical idea described in the following claims, the specification described above and the accompanying drawings without departing from the spirit and scope of the present invention. In this regard, even any shape, structure or material that is not described directly in the specification and the drawings falls within the technical idea of the present invention so long as the function and the effect of the present invention are achieved.

What is claimed is:

1. A gear pump, comprising:
    a drive shaft;
    a rotary shaft arranged in parallel to the drive shaft;
    a first pump constructed from a first drive gear, a first driven gear rotatably arranged coaxially with the rotary shaft and a first pump chamber for receiving the first drive gear and the first driven gear, the first drive gear being rotated by driving of the drive shaft, the first driven gear engaging the first drive gear, the first pump chamber having a first suction port via which oil is suctioned in accordance with rotation of the first drive gear and rotation of the first driven gear and a first discharge port from which the oil is discharged; and a second pump constructed from a second drive gear rotatably provided coaxially with the rotary shaft, a second driven gear rotatably provided coaxially with the drive shaft and a second pump chamber for receiving the second drive gear and the second driven gear, the second driven gear engaging with the second drive gear, the second pump chamber having a second suction port via which oil is suctioned in accordance with rotation of the second drive gear and rotation of the second driven gear and a second discharge port from which the oil is discharged, wherein the rotary shaft is configured such that the first driven gear and the second drive gear engage directly with and disengage from the rotary shaft in a rotation direction by being moved in an axial direction, and wherein the gear pump is configured to selectively operate in a first state or second state, wherein in the first state, the first driven gear and the second drive gear are configured to rotate relatively and the rotation of the first driven gear is not transmitted to the second drive gear, thereby operating only the first pump, and wherein in the second state, the first driven gear and the second drive gear are not configured to rotate relatively and the rotation of the first driven gear is transmitted to the second drive gear, thereby operating both of the first pump and the second pump.

2. The gear pump as claimed in claim 1, wherein the rotary shaft spline-engages with the second drive gear to rotate together with the second drive gear, wherein the gear pump further comprises:

an engaging section for causing the rotary shaft to engage with or disengage from the first driven gear with movement of the rotary shaft, wherein, when the rotary shaft is positioned at a first pump side, the engaging section causes the rotary shaft to spline-engage with the first driven gear, whereby the second drive gear and the first driven gear are not allowed to rotate mutually, and wherein, when the rotary shaft is positioned at a second pump side, the engaging section causes spline engagement of the rotary shaft with the first driven gear to be released, whereby the second drive gear and the first driven gear are allowed to rotate mutually.

3. The gear pump as claimed in claim 1, further comprising:

two oil chambers for respectively applying hydraulic pressures to both ends of the rotary shaft, wherein the gear pump is configured so that the rotary shaft moves in the axial direction in accordance with loads applied to the both ends of the rotary shaft due to a difference between pressures of the two oil chambers.

4. The gear pump as claimed in claim 3, wherein an oil passage in which the oil discharged from the first pump flows is connected to each of the two oil chambers, and the gear pump is configured so that the rotary shaft is positioned at the first pump side when discharge pressure of the first pump becomes predetermined pressure or lower.

5. The gear pump as claimed in claim 1, comprising:

a first oil chamber for applying hydraulic pressure to the end surface at the first pump side of the rotary shaft;

a second oil chamber for applying hydraulic pressure to the end surface at the second pump side of the rotary shaft;

a first oil passage that supplies oil discharged from the first pump to the first oil chamber;

a second oil passage that supplies oil discharged from the first pump to the second oil chamber; and a regulator valve provided in the second oil passage, wherein when oil pressure of oil charged from the first pump and supplied to the second oil chamber via the second oil passage become higher than a predetermined pressure, the regulator valve closes the second oil passage, thereby stopping supplying oil pressure to the second oil chamber.

6. The gear pump as claimed in claim 1, comprising:

a first oil chamber for applying hydraulic pressure to the end surface at the first pump side of the rotary shaft;

a second oil chamber for applying hydraulic pressure to the end surface at the second pump side of the rotary shaft;

a first oil passage that supplies oil discharged from the first pump to the first oil chamber; and a second oil passage that supplies oil discharged from the first pump to the second oil chamber, wherein an area of the end surface at the first pump side of the rotary shaft is smaller than an area of the end surface at the second pump side of the rotary shaft, and when a discharge pressure of the first pump becomes predetermined pressure or less, the rotary shaft is positioned at the first pump side.

\* \* \* \* \*